(12) United States Patent
Chong

(10) Patent No.: US 6,434,221 B1
(45) Date of Patent: Aug. 13, 2002

(54) DIGITAL SUBSCRIBER LINE ACCESS AND NETWORK TESTING MULTIPLEXER

(75) Inventor: Raymond L. Chong, San Jose, CA (US)

(73) Assignee: Sunrise Telecom, Inc., San Jose, CA (US)

( * ) Notice: Subject to any disclaimer, the term of this patent is extended or adjusted under 35 U.S.C. 154(b) by 0 days.

(21) Appl. No.: 09/574,696

(22) Filed: May 17, 2000

(51) Int. Cl.⁷ .................................................. H04M 1/24
(52) U.S. Cl. .................. 379/27.01; 379/1.04; 379/27.03
(58) Field of Search .......................... 379/1.01, 1.04, 379/1.03, 10.01, 12, 22.02, 22.04, 24, 26.01, 27.01, 27.03, 27.08, 28, 29.01, 30, 32.02, 32.04; 370/241, 242, 244

(56) References Cited

U.S. PATENT DOCUMENTS

| | | | | | |
|---|---|---|---|---|---|
| 5,598,455 A | * | 1/1997 | Bliven et al. | .................. | 379/27 |
| 5,974,030 A | * | 10/1999 | Tiihonen et al. | ............. | 370/241 |
| 5,991,270 A | * | 11/1999 | Zwan et al. | ................. | 370/249 |
| 6,104,749 A | * | 8/2000 | Lu et al. | ...................... | 375/222 |
| 6,130,879 A | * | 10/2000 | Liu | ............................. | 30/230 |
| 6,215,855 B1 | * | 4/2001 | Schneider | .................... | 379/22 |
| 6,219,378 B1 | * | 4/2001 | Wu | ............................. | 375/231 |
| 6,259,676 B1 | * | 7/2001 | Kellock et al. | ................ | 379/27 |
| 6,266,348 B1 | * | 7/2001 | Gross et al. | ................ | 370/493 |

\* cited by examiner

*Primary Examiner*—Curtis Kuntz
*Assistant Examiner*—Rexford Barnie
(74) *Attorney, Agent, or Firm*—Mikio Ishimaru (57) ABSTRACT

A Digital Subscriber Line Access Multiplexer includes a set of line cards, a set of xDSL modem cards, a redundant xDSL modem card, a test and switching unit, a control unit, and a trunk unit. Each line card may include a switch, through which the control unit may selectively direct the line card to couple to a corresponding xDSL modem card or a redundancy bus. The test and switching unit is coupled to the redundancy bus, and includes a relay matrix and a Copper Loop Tester (CLT). In response to commands received from the control unit, the relay matrix may route redundancy bus signals to the CLT and/or the redundant xDSL modem card. The CLT performs tests to measure or determine subscriber loop electrical characteristics in response to control unit commands, and returns test results to the control unit.

18 Claims, 9 Drawing Sheets

DIGITAL SUBSCRIBER LINE ACCESS AND NETWORK TESTING MULTIPLEXER

CROSS-REFERENCE TO RELATED DOCUMENTS

The present invention relates to, and incorporates by reference, 1) U.S. patent application Ser. No. 09/215,421, entitled "Telecommunications Transmission Test Set," filed on Dec. 18, 1998; and 2) U.S. patent application Ser. No. 09/295,857, entitled "Detection of Bridge Tap Using Frequency Domain Analysis," filed on Apr. 21, 1999.

FIELD OF THE INVENTION

The present invention relates generally to telecommunication network test equipment. More particularly, the present invention is a Digital Subscriber Line Access Multiplexer (DSLAM) that incorporates built-in subscriber loop and network test and measurement capabilities.

BACKGROUND

The demand for access to digital communications networks, such as the Internet, is directly related to the speed or rate at which such networks can transfer data. Higher data transfer rates provide a foundation for increased communication efficiency and new types of communication applications or services. These, in turn, fuel demand for more widespread network access and still-higher data transfer rates.

Conventional analog modems currently provide a maximum data transfer rate of 56 kilobits per second (kbps). Other technologies, such as cable modems, can offer significantly improved performance, but typically require changes in a telecommunication network's underlying architecture. Such changes may necessitate large network infrastructure investments to meet user demand for network accessibility.

Digital Subscriber Line (DSL) technology provides increased communications bandwidth while using existing twisted-pair copper lines that are prevalent throughout much of the world. DSL delivers a basic data transfer rate of 128 kbps. High speed DSL, or HDSL, can deliver a data transfer rate of 1.544 megabits per second (Mbps) in North America, and 2.048 Mbps elsewhere. Asymmetric DSL, or ADSL, can deliver data rates ranging from 1.5 to 9.0 Mbps on a downstream or receiving path, and 16 to 800 kbps on an upstream or sending path. Taken together, varying DSL technologies are referred to as xDSL.

Figure 1:
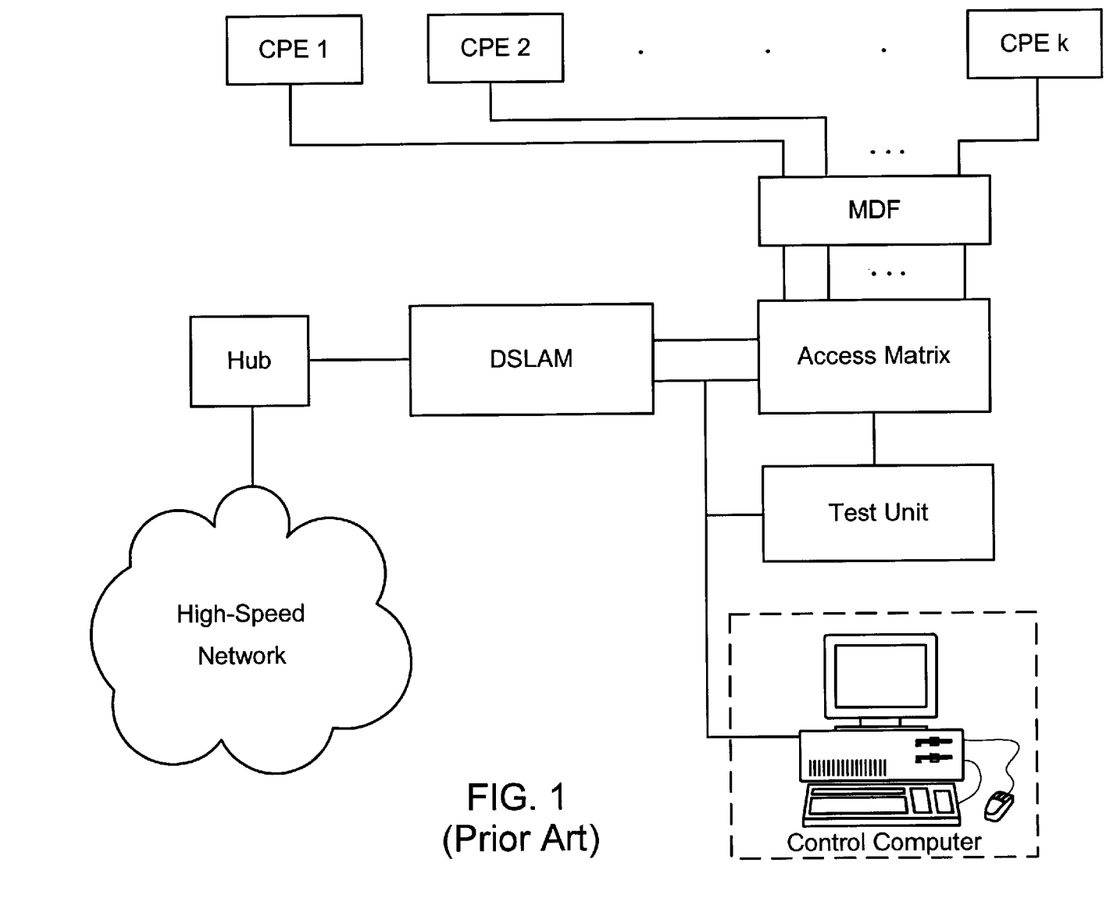
FIG. 1 is a block diagram of a prior art Digital Subscriber Line communications network organization.

FIG. 1 is a block diagram of a conventional xDSL communications network organization. In FIG. 1, a set of Customer Premises Equipment (CPE) units is coupled to a Main Distribution Frame (MDF). Each CPE unit comprises an xDSL modem, and is located at a customer site. The MDF is coupled to an access matrix, which itself is coupled to a DSL Access Multiplexer (DSLAM) and a test unit. Each of the MDF, the access matrix, the test unit, and the DSLAM reside at an xDSL service provider's site. The DSLAM is also coupled to a network gateway or hub, which in turn is coupled to a high-speed transmission line or backbone that connects to an external network. Finally, the access matrix, the DSLAM, and the test unit are each coupled to a control computer.

The high-speed backbone is characterized by a data transfer rate much greater than that associated with any given CPE unit. Taken together, the DSLAM, the access matrix, and the MDF provide a signal exchange interface between the high-speed backbone and the CPE units. The DSLAM includes a set of xDSL modems and signal multiplexing circuitry, while the access matrix includes computer-controlled switching circuitry.

Each CPE unit is coupled to the MDF via a network of twisted pair wiring. The signal transfer pathway between any given CPE unit and the MDF is commonly referred to as a "local loop." A local loop's maximum data transfer rate is dependent upon its electrical characteristics, as readily understood by those skilled in the art. Due to variations in signal path length, environmental conditions, and interconnection history, any given local loop's electrical characteristics may significantly differ from those of another local loop. Moreover, a local loop's electrical characteristics may change over time due to variations in twisted pair line conditions. As a result, the ability to determine accurately local loop electrical characteristics is critical to the installation and maintenance of xDSL connections.

The test unit comprises hardware and software that facilitates local loop electrical characterization. The test unit provides capabilities such as those described in U.S. patent application Ser. No. 09/215,421, entitled "Telecommunications Transmission Test Set," filed on Dec. 18, 1998; and U.S. patent application Ser. No. 09/295,857, entitled "Detection of Bridge Tap Using Frequency Domain Analysis," filed on Apr. 21, 1999.

The organization of the DSLAM, the access matrix, and the test unit as shown in FIG. 1 is undesirably space and cost inefficient. In many prior art configurations, the test unit is roughly comparable in size to the DSLAM itself. What is needed is a different type of configuration that is highly space and cost efficient.

SUMMARY OF THE INVENTION

The present invention comprises a Digital Subscriber Line Access Multiplexer (DSLAM) or Concentrator that incorporates built-in hardware and/or software for measuring and/or determining subscriber loop and/or DSL network electrical characteristics. Herein, the present invention is referred to as a Digital Subscriber Line Access and Network Testing Mulitplexer (DSLANTM). In one embodiment, the DSLANTM comprises a set of line cards; a set of xDSL modem cards; a redundant xDSL modem card; a test and switching unit; at least one control unit; and at least one trunk unit. The present invention further comprises an interface unit into which each of the aforementioned elements couples.

The interface unit provides electrical couplings that facilitate selective signal exchange between DSLANTM elements. In one embodiment, the interface unit comprises a midplane circuit board having a first side and a second side. The first side includes electrical connectors for receiving the line cards and each trunk unit, while the second side includes electrical connectors for receiving the xDSL modem cards, the redundant xDSL modem card, and each control unit. Other interface unit embodiments will be readily apparent to those skilled in the art.

The interface unit may include a power bus, a control bus, and a redundancy bus. The power bus facilitates electrical power delivery to each DSLANTM element. The control bus facilitates a control unit's issuance or assertion of control signals to particular DSLANTM elements, where such control signals may include data signals and memory addresses. Lastly, the redundancy bus facilitates coupling one or more line card ports to the redundant xDSL modem card and/or the test and switching unit, such that the test and switching unit may determine or measure subscriber loop electrical characteristics as further described below.

Each line card, xDSL modem card, and trunk unit is coupled to a control unit. The control unit may comprise a processing unit, a memory, and high-speed switching circuitry. The control unit selectively directs the operation of each DSLANTM element; issues commands to establish particular couplings between and/or within given DSLANTM elements at particular times; and oversees or manages incoming and outgoing data communication traffic.

Each line card is coupled to a Main Distribution Frame (MDF), which in turn is coupled to Customer Premises Equipment (CPE) units associated with subscriber loops. Any given line card provides multiple xDSL communication ports, and includes signal coupling and electrical isolation circuitry. A line card also includes a switch that facilitates coupling line card ports to 1) the redundancy bus; or 2) an xDSL modem card corresponding to the line card in response to a signal, command, or directive received from a control unit. Each xDSL modem card, including the redundant xDSL modem card, comprises conventional xDSL modem hardware and software. Each trunk unit serves as an interface for carrying aggregated data communication traffic between a control unit and a hub, where the hub is coupled to a high-speed network.

The test and switching unit is coupled to the redundancy bus, and comprises power interface circuitry, control logic, a relay matrix, a memory, and a Copper Loop Tester (CLT). The test and switching unit's control logic serves as an interface for communicating with the DSLANTM's control unit. The relay matrix comprises a set of switches and a port selector. In response to a signal, command, or directive issued by the control unit, the relay matrix may route signals present upon the redundancy bus to the redundant xDSL modem card and/or the CLT. The port selector chooses a given line card port present upon the redundancy bus for coupling to the CLT, in accordance with a control unit signal, command, or directive. Thus, via a line card's switch, the redundancy bus, and the relay matrix, the CLT may be coupled to 1) an isolated subscriber loop, or 2) a subscriber loop that may communicate or exchange signals with the redundant xDSL modem card.

The CLT comprises a subscriber loop test and measurement unit, and in one embodiment includes a processing unit, a Digital Signal Processor (DSP), a memory, and a set of test units. The test units may include a Digital Multimeter (DMM) test circuit, a Time Domain Reflectometry (TDR) test circuit, a line impairment test circuit, and/or other test circuits. In one embodiment, the CLT is essentially or generally analogous in structure and functionality to subscriber loop test equipment described in U.S. patent application Ser. No. 09/215,421, entitled "Telecommunications Transmission Test Set," filed on Dec. 18, 1998; and 2) U.S. patent application Ser. No. 09/295,857, entitled "Detection of Bridge Tap Using Frequency Domain Analysis," filed on Apr. 21, 1999.

In response to commands issued by the control unit, the CLT performs tests to measure and/or determine one or more subscriber loop electrical characteristics. In one embodiment, the CLT stores test results to the control unit via the test and switching unit's memory. The control unit may subsequently retrieve such test results. In one embodiment, the test and switching unit includes a direct CLT control port, through which a device external to the DSLANTM may direct CLT operation and receive or retrieve test results.

As the present invention comprises a single device having line card port routing, port selection, and CLT elements incorporated therein, the present invention provides a highly compact, cost efficient DSLAM capable of electrically characterizing subscriber loops.

BRIEF DESCRIPTION OF THE DRAWINGS

Table 1 describes a set of local loop tests supported by the Copper Loop Tester of the present invention.

Table 2 provides a listing of commands for communicating with the Copper Loop Tester of the present invention.

DETAILED DESCRIPTION

Figure 2:
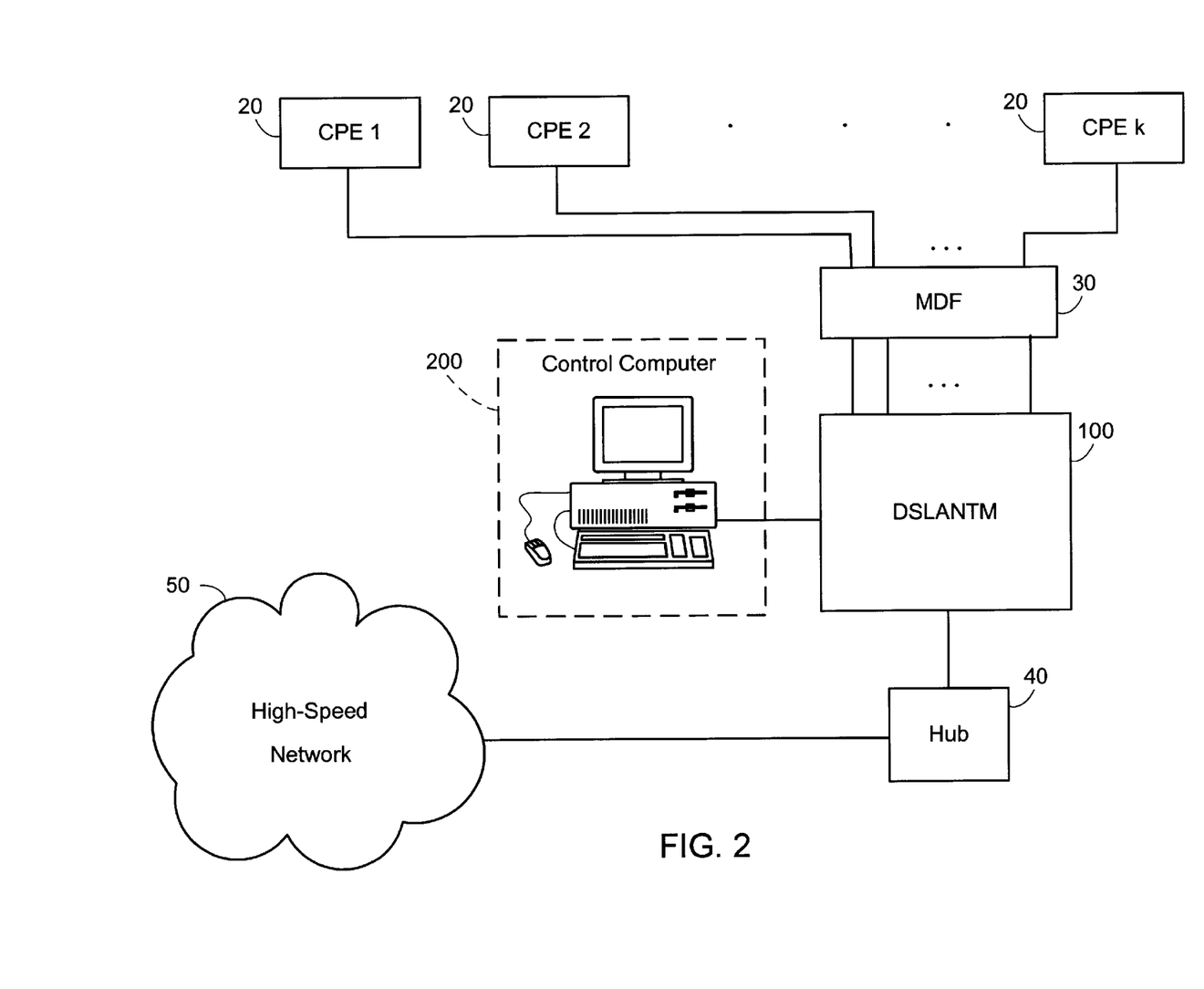
FIG. 2 is a block diagram of a Digital Subscriber Line communications network organization facilitated by the present invention.

FIG. 2 is a block diagram of a DSL communications network organization 10 facilitated by the present invention. In FIG. 2, a Digital Subscriber Line Access and Network Testing Multiplexer (DSLANTM) 100 constructed in accordance with the present invention is coupled to a Main Distribution Frame (MDF) 30, a gateway or hub 40, and a control computer 200. The MDF 30 is coupled to a set of Customer Premises Equipment (CPE) units 20, each of which includes an xDSL modem. The hub 40 is coupled via a conventional backbone line to a high-speed network 50, such as an Asynchronous Transfer Mode (ATM) segment of the internet.

In one embodiment, each CPE unit 20 is conventional, as are the MDF 30 and the hub 40. The control computer 200 may also be conventional, typically comprising a workstation or server system having a processing unit; a memory; a data storage unit; an Input/Output (I/O) unit that facilitates user input via a keyboard and/or a mouse or other pointing device; a display device; and a network interface unit or communication port that facilitates signal exchange with the DSLANTM 100.

As described in detail below, the DSLANTM 100 of the present invention incorporates signal path selection circuitry as well as built-in hardware and software that can perform a wide variety of electrical tests upon DSL communications networks. By design, the signal path selection circuitry and the built-in electrical testing elements occupy little area, and hence the network organization 10 shown in FIG. 2 is space and cost efficient. The DSLANTM 100 may establish particular electrical couplings and perform certain electrical test sequences in response to commands received from the control computer 200. The control computer 200 itself may generate such commands in response to user input.

Figure 3:
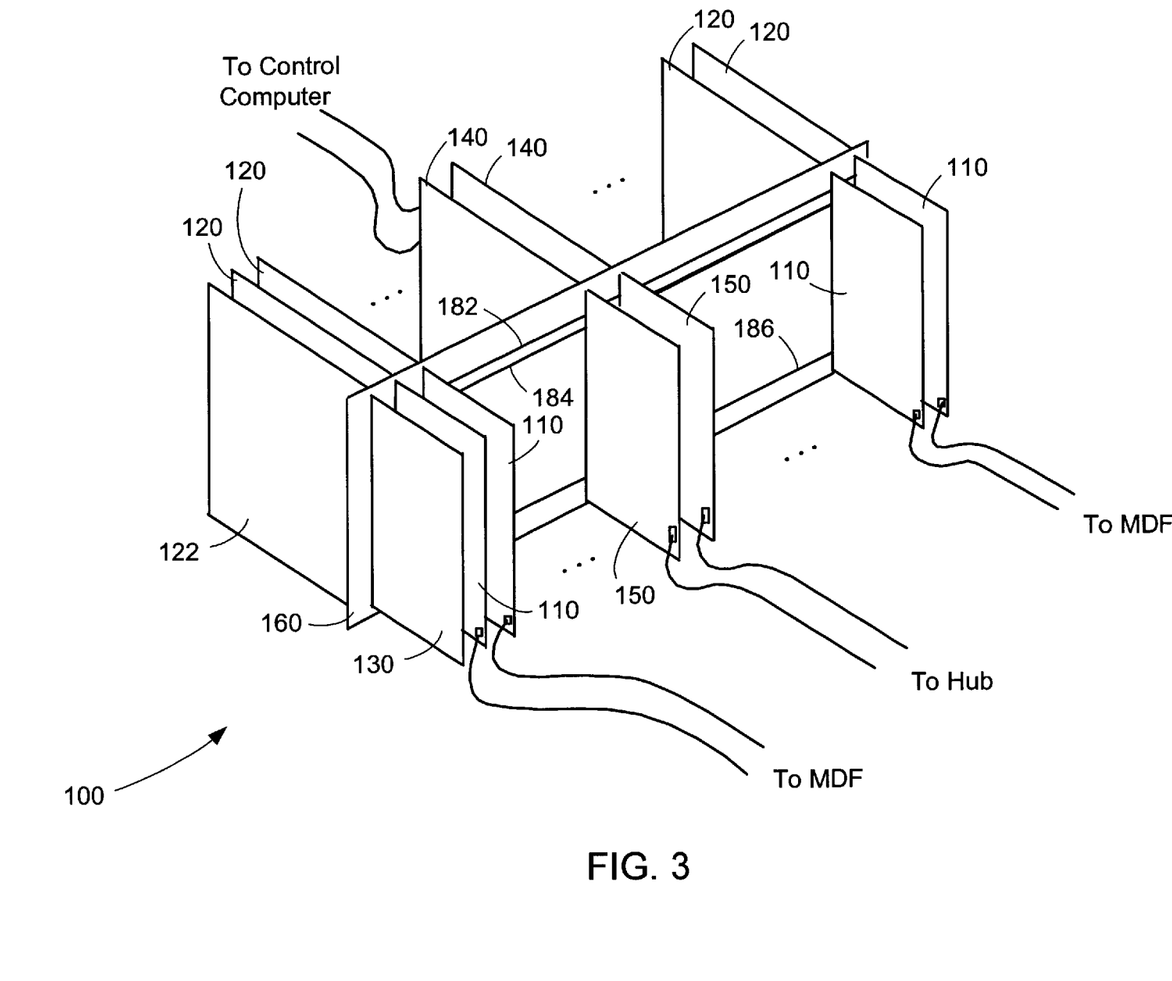
FIG. 3 is a perspective drawing of a Digital Subscriber Line Access and network Testing Multiplexer constructed in accordance with the present invention.

FIG. 3 is a perspective drawing of a Digital Subscriber Line Access and Network Testing Multiplexer 100 constructed in accordance with the present invention. In one embodiment, the DSLANTM 100 comprises a set of line cards 110; a set of xDSL modem cards 120, including a redundant xDSL modem card 122; a test and switching unit 130; at least one control unit 140; and at least one trunk unit 150. Each of the aforementioned elements is coupled to an interface module 160. Additionally, each line card 110 is coupled to the MDF 30, and each trunk unit 150 is coupled to the hub 40. Finally, each control unit 140 is coupled to the control computer 200.

The interface module 160 comprises a circuit board or card that selectively facilitates signal exchange between the line cards 110, the xDSL modem cards 120, 122, the test and switching unit 130, the control units 140, and the trunk units 150. In the embodiment shown in FIG. 3, the interface module 160 comprises a midplane circuit board or card. Those skilled in the art will recognize that the interface module 160 includes a first set of conventional connectors, pins, sockets, and/or receptacles (not shown) for receiving and selectively providing electrical couplings to the line cards 110, the test and switching unit 130, and the trunk units 150. The interface module 160 further includes a second set of conventional connectors, pins, sockets and/or receptacles (not shown) for receiving and selectively providing electrical couplings to the xDSL modem cards 120 and the control units 140. Thus, the line cards 110, the test and switching unit 130, and the trunk units 150 may "plug in" to connectors on a first side of the interface module 160; while the xDSL modem cards 120 and the control units 140 may plug in to connectors on the a second side of the interface unit 160. The interface module 160 may therefore serve to physically separate and, on a selective basis, electrically couple, each of the aforementioned DSLAM elements. Those skilled in the art will also recognize that the interface module 160 could provide the aforementioned electrical couplings in a different manner, and/or that the interface module 160 may comprise a backplane or other type of circuit card or board in an alternate embodiment.

The interface module 160 provides a signal pathway between each line card 110 and a corresponding xDSL modem card 120 or the redundant xDSL modem card 122. In the embodiment shown in FIG. 3, the xDSL modem card corresponding to a given line card 110 may reside essentially directly across from the line card 110, separated by the interface module 160. The redundant xDSL modem card 122 may reside directly across from the test and switching unit 130, separated by the interface unit 160. Other card configurations are possible in alternate embodiments.

The interface module 160 also provides a set of signal pathways between each control unit 140 and the line cards 110, the xDSL modem cards 120, 122, the test and switching unit 130, and the trunk units 150, thereby facilitating the selective exchange of control and communication signals between and/or among the control units 140 and each of the aforementioned elements. In one embodiment, the interface module 160 includes a power bus 182, a control bus 184, and a redundancy bus 186. The power bus 182 supplies power to each element within the DSLANTM 100, while the control bus 184 carries control signals generated by the control units 140. The redundancy bus 186 facilitates signal exchange between a given line card 110 to the test and switching unit 130, which in turn may selectively route signals to or from electrical test circuitry and/or the redundant xDSL modem card 122 as described in detail below.

The control unit 140 selectively directs the initialization and operation of each DSLANTM element via the issuance or assertion of signals upon the control bus 184. The control unit 140 additionally manages dataflow between the xDSL modem cards 120, 122 and the trunk units 150. In one embodiment, the control unit 140 includes a processing unit, a memory, and high-speed switching circuitry. Those skilled in the art will understand that the control unit 140 may include additional or other types of elements in an alternate embodiment. When two control units 140 are present, a first control unit 140 may serve as a primary controller, and the second control unit 140 may serve as a backup controller in the event that the primary control unit 140 fails. The control unit 140 itself is responsive to signals received from the control computer 200. Those skilled in the art will understand that the control unit 140 may include multiple external ports that facilitate coupling to a network or server in a variety of manners.

Each line card 110 comprises conventional signal coupling and electrical isolation circuitry that minimizes the effects of undesirable signal level spikes, surges, or fluctuations during signal exchange with its corresponding xDSL modem card 120. Each line card 110 may support multiple communication ports, for example, 24 or 48 ports. In one embodiment, each line card 110 also includes a switch that selectively directs incoming signals to its corresponding xDSL modem card 120 or the redundancy bus 186, as described hereafter.

Figure 4:
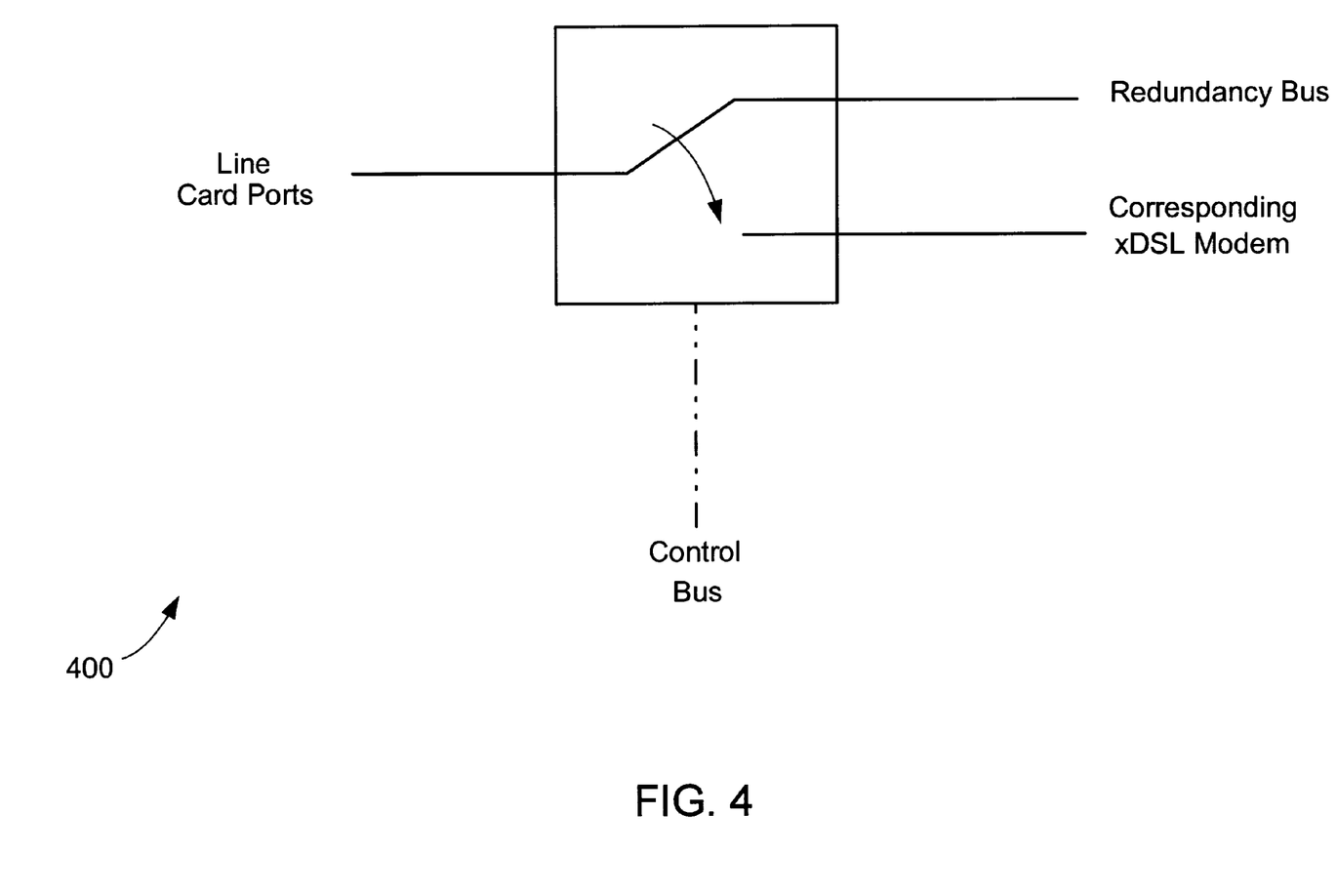
FIG. 4 is a schematic diagram of a redundancy selection switch of the present invention.

FIG. 4 is a schematic diagram of a redundancy selection switch 400 of the present invention. In one embodiment, the redundancy selection switch 400 comprises a conventional software-controllable switch that facilitates signal exchange with the redundancy bus 186 in response to a signal received from a control unit 140. During typical operation, the redundancy selection switch 400 provides a set of signal pathways from the line card 110 upon which it resides to the line card's corresponding xDSL modem card 120, thereby coupling the line card's ports to the xDSL modem card 120. In the event that this xDSL modem card 120 fails, or in the event that subscriber loop or DSL network testing operations are required, a control unit 140 issues a signal to the redundancy selection switch 400, which in turn couples one or more of the line card's k ports to the redundancy bus 186. In one embodiment, each line card port spans a first and a second line or electrical pathway; thus, each port may require two lines upon the redundancy bus 186.

Referring again to FIG. 3, each xDSL modem card 120, 122 comprises conventional xDSL modem circuitry that receives incoming signals from a line card 110, and performs any required multiplexing/demultiplexing, signal format conversion, and traffic management operations prior to forwarding communication traffic to a control unit 140. Those skilled in the art will recognize that an xDSL modem card 120 may perform analogous operations relative to outbound communication traffic received from the control unit 140 and directed to the xDSL modem card's corresponding line card 110. In one embodiment, the DSLANTM 100 may support xDSL modem cards 120 that operate in accordance with multiple types of DSL standards, such as ADSL, HDSL, HDSL/2, IDSL, SDSL, VDSL, and/or essentially any other xDSL standard.

Each trunk unit 150 comprises conventional circuitry that serves as an interface for carrying aggregated communication traffic between a control unit 140 and the hub 40. When two trunk units 150 are present, both trunk units 150 may simultaneously carry communication traffic, or one trunk unit 150 may function in a primary role, while the second trunk unit 150 may function in a backup role in the event that the primary trunk unit 150 fails.

As previously indicated, the control unit 140 may direct a given line card to transfer signals via the redundancy bus 186 in the event that the line card's corresponding xDSL modem card 120 has failed, or when subscriber loop testing is required. The test and switching unit 130 selectively routes signals present upon the redundancy bus 186 in the manner described hereafter.

Figure 5:
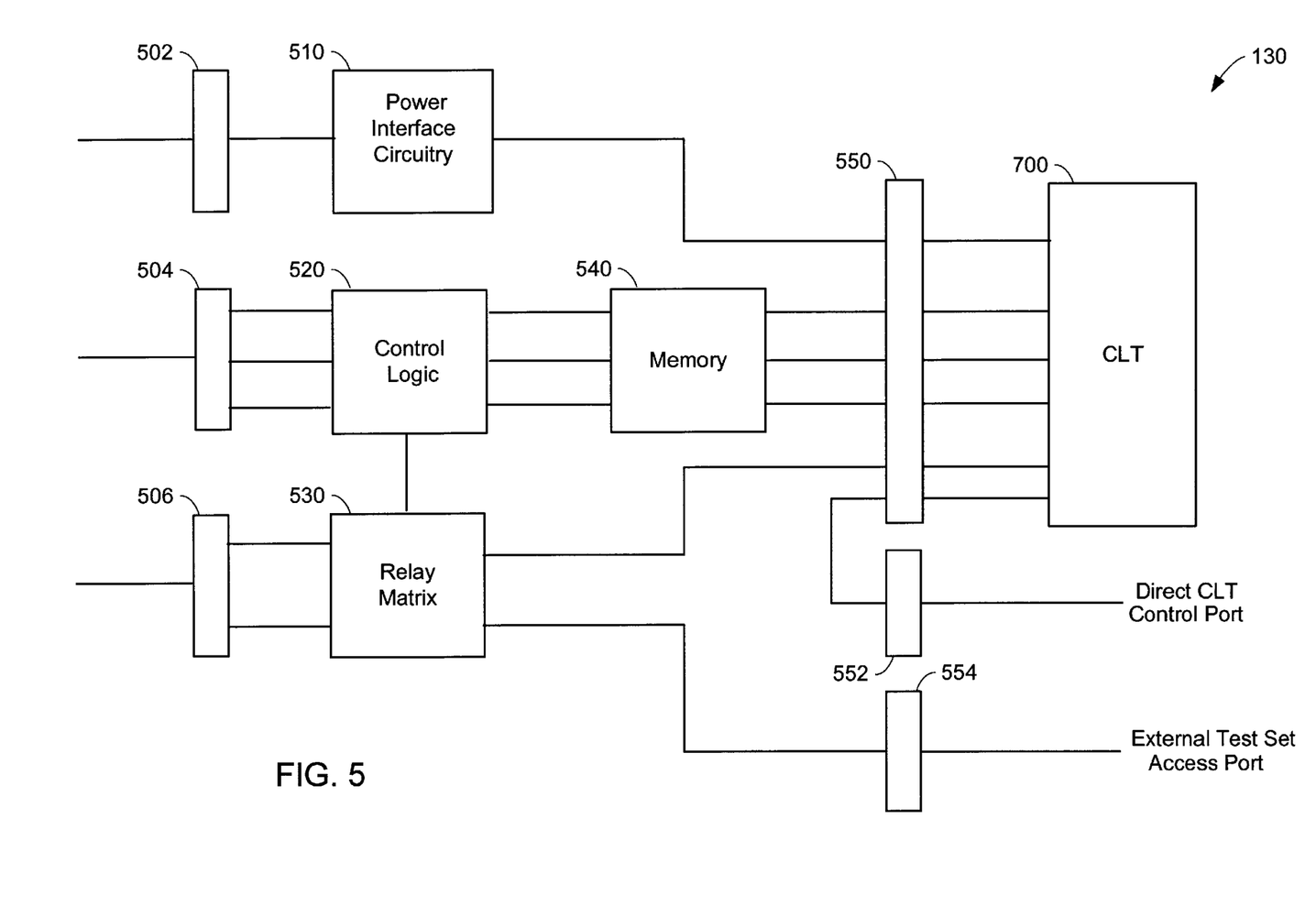
FIG. 5 is a block diagram of a test and switching unit constructed in accordance with the present invention.

FIG. 5 is a block diagram of a test and switching unit 130 constructed in accordance with the present invention. In one embodiment, the test and switching unit 130 comprises power interface circuitry 510, control logic 520, a relay matrix 530, a memory 540, and a Copper Loop Tester (CLT) 700. The power interface circuitry 510 is coupled to the power bus 182 via a first connector 502. Similarly, the control logic 520 is coupled to the control bus 184 via a second connector 504, and the relay matrix 530 is coupled to the redundancy bus 186 via a third connector 506. A fourth connector 550 couples the CLT 700 to the power interface circuitry 510, the relay matrix 530, the memory 540, and a direct CLT control port 552. The direct CLT control port 552 may comprise, for example, a conventional serial port or other type of interface, and in one embodiment facilitates direct control of the CLT 700 via a device external to the DSLANTM 100. The relay matrix 530 is coupled to an external test set access port 554, which itself may comprise a conventional serial port or other type of interface. The external test set access port 554 may be used to couple the DSLANTM 100 to an external test set, such as that described in U.S. patent application Ser. No. 09/215, 421, entitled "Telecommunications Transmission Test Set," to the DSLANTM 100. Finally, the memory 540 and the relay matrix 530 are coupled to the control logic 520. Those skilled in the art will recognize that one or more of the aforementioned connectors may comprise direct, integrated wiring in accordance with particular embodiment details.

The power interface circuitry 510 comprises conventional circuitry that receives a power signal from the power bus 182, and performs any signal level conversion required to supply power to the CLT 700. The power interface circuitry 510 may, for example, receive a −48 Volt DC signal from the power bus 182, and supply the CLT 700 with a +5 and/or a +3.3 Volt signal.

In one embodiment, the control bus 184 may carry at least three types of signals, namely, control, address, and data signals. The control signals comprise directives or commands issued by the control unit 140. With respect to the test and switching unit 130, such commands may be directed to the relay matrix 530 or the CLT 700. The address signals indicate addresses within the memory 540 at which data signals are to be stored or retrieved, in a manner readily understood by those skilled in the art. Data signals may include commands and associated parameters output by the control unit 140 to direct manners in which particular subscriber loop or network tests are performed; and/or test results generated by the CLT 700.

The control logic 520 comprises bus interface circuitry that receives control bus signals, and determines whether such signals are directed to or intended for the test and switching unit 130. Control bus signals directed to the test and switching unit 130 may include directives corresponding to relay matrix operation; or read/write commands directed to the memory 540. A relay matrix directive indicates or corresponds to a manner in which the relay matrix 530 routes signals present upon the redundancy bus 186 to the CLT 700, the redundant xDSL modem card 122, and/or the external test set access port 554. As previously indicated, the external test set access port 554 may be used to couple an external test set, such as that described in U.S. patent application Ser. No. 09/215,421, entitled "Telecommunications Transmission Test Set," to the DSLANTM 100.

Figure 6:
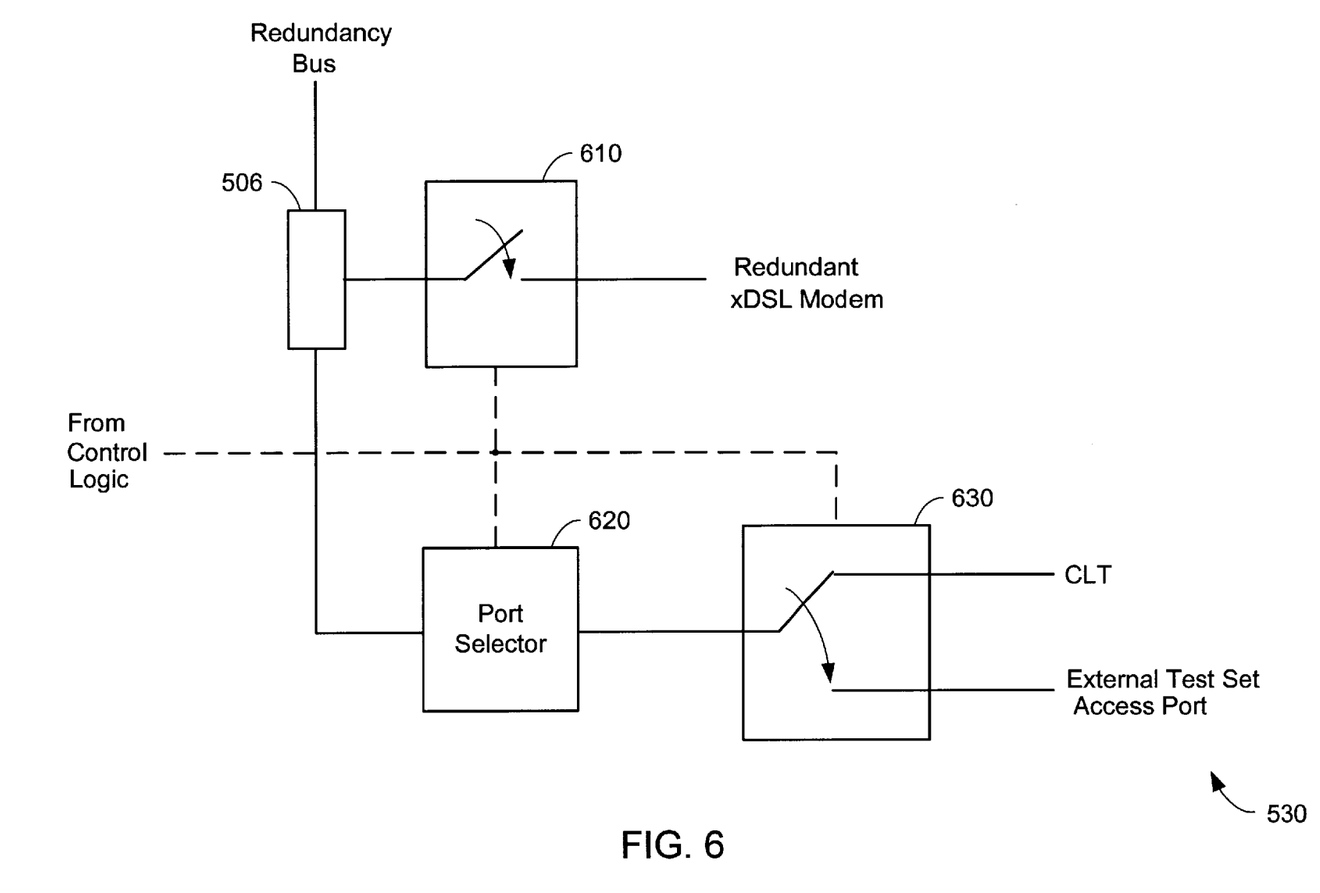
FIG. 6 is a schematic diagram of a relay matrix of the present invention.

FIG. 6 is a schematic drawing of a relay matrix 530 constructed in accordance with the present invention. In one embodiment, the relay matrix 530 comprises a software-controllable bidirectional path selector having a first switch 610, an n:1 port selector 620, and a second switch 630. The first switch 610 is coupled to the redundancy bus 186 and the redundant xDSL modem card 122. The port selector 620 is coupled to the redundancy bus 186 and the second switch 630, which itself is coupled to the CLT 700 and the external test set access port 554. Additionally, the first switch 610, the port selector 620, and the second switch 630 each include control inputs coupled to the control logic 520.

The first switch 610 comprises a conventional software-controllable switch that selectively establishes electrical couplings between the redundancy bus 186 and the redundant xDSL modem card 122 in response to a signal received via the control logic 520. The port selector 620 comprises a conventional signal selector or multiplexer that selectively couples signals upon the redundancy bus 186 corresponding to a line card port to the second switch 630. In one embodiment, the port selector 620 may selectively couple at least one of n line card port signals present upon the redundancy bus 186 to the second switch 630, where n is less than or equal to k. Finally, the second switch 630 comprises a conventional software-controllable switch that selectively establishes electrical couplings to either the CLT 700 or the external test set access port 554 in response to a signal received via the control logic 520.

Once the control unit 140 has directed a given line card's redundancy selection switch 400 to couple one or more of the line card's ports to the redundancy bus 186, the control unit 140 may subsequently direct the control logic 520 to employ the relay matrix 520 to couple the redundancy bus 186 to the redundant xDSL modem card 122 and/or a signal pathway that facilitates the performance of subscriber loop electrical tests. Such electrical tests may therefore be performed with the subscriber loop either isolated from or coupled to the DSL network.

Referring again to FIG. 5, the memory 540 provides a signal exchange interface between the control logic 520 and the CLT 700. The memory 540 stores electrical test commands and associated setup or initialization parameters received from the control unit 140. The memory 540 additionally stores electrical test and characterization results generated by the CLT 700, where the control unit 140 may retrieve such results as required. In one embodiment, the memory 540 comprises a conventional dual-port Random Access Memory (RAM), where each port may provide couplings corresponding to control, address, and data signals. Those skilled in the art will recognize that other memory configurations may be employed in alternate embodiments.

The test and switching unit's CLT 700 provides built-in electrical test, measurement, and/or characterization capabilities. In one embodiment, the structure and functionality of the CLT 700 of the present invention are essentially or substantially identical to that described in U.S. patent application Ser. No. 09/215,421, entitled "Telecommunications Transmission Test Set," filed on Dec. 18, 1998, which is incorporated herein by reference.

Figure 7:
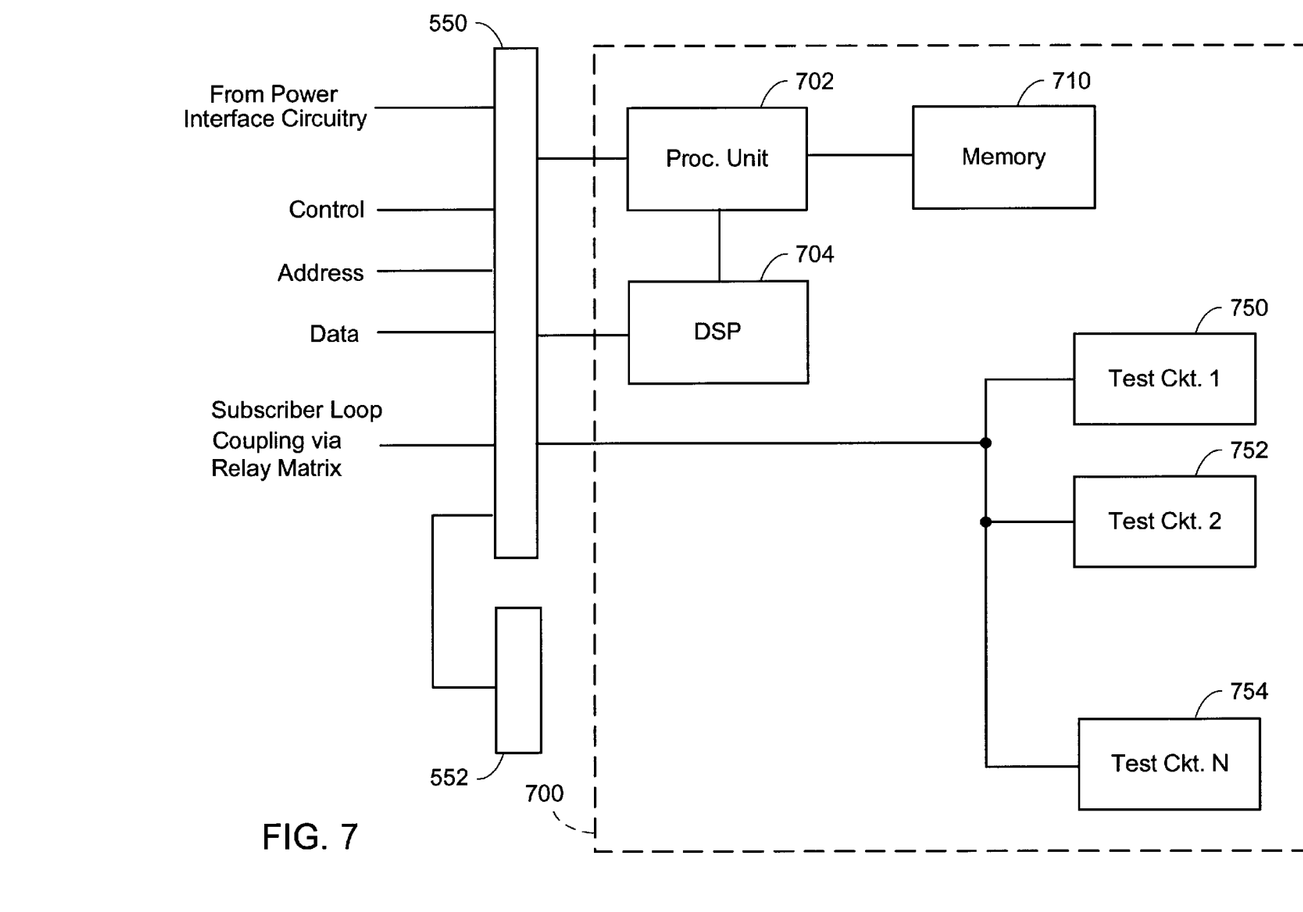
FIG. 7 is a block diagram of a Copper Loop Tester constructed in accordance with the present invention.

FIG. 7 is a block diagram of a Copper Loop Tester 700 constructed in accordance with the present invention. In one embodiment, the CLT 700 comprises a processing unit 702, a Digital Signal Processor (DSP) 704, a memory 710, and a set of test circuits 750, 752, 754. The processing unit 702 and the DSP 704 are coupled to the fourth connector 550, and may thereby access the test and measurement unit's memory 540 as well as the direct CLT control port 552. The direct CLT port 552 may therefore enable the processing unit 702 and/or the DSP 704 to directly or essentially directly communicate with a device or controller external to the DSLANTM 100. The processing unit 702 and the DSP 704 may further maintain a direct coupling to each other. The CLT's memory 710 is coupled to the processing unit 702. Each test circuit 750, 752, 754 is coupled to the fourth connector 550, which provides an interface for coupling each test circuit 750, 752, 754 to the redundancy bus 186 via the second switch 630 within the relay matrix 530. In other words, each test circuit 750, 752, 754 may be coupled to a subscriber loop selected via the relay matrix 530.

In one embodiment, each test circuit 750, 752, 754 may exchange signals with the processing unit 702 and/or the DSP 704, and is capable of performing particular types of tests or measurements. For example, a first test circuit 750 may comprise a Digital MultiMeter (DMM) test circuit. A second test circuit 752 may comprise a Time Domain Reflectometry (TDR) test circuit, and a third test circuit 754 may comprise a line impairment test circuit. The structure and functionality of each such test circuit is described in detail in U.S. patent application Ser. No. 09/215,421, entitled "Telecommunications Transmission Test Set," filed on Dec. 18, 1998; and U.S. patent application Ser. No. 09/295,857, entitled "Detection of Bridge Tap Using Frequency Domain Analysis," filed on Apr. 21, 1999. Those skilled in the art will recognize that other or additional test circuits may be present in accordance with the test and measurement capabilities required or desired in any given embodiment.

As mentioned above, the control unit 140 may control, direct, or manage the operation of the CLT 700 by issuing commands to the test and switching unit 130. In one embodiment, the CLT 700 may also or alternatively be controlled by signals received via the direct CLT control port 552.

Figure 8:
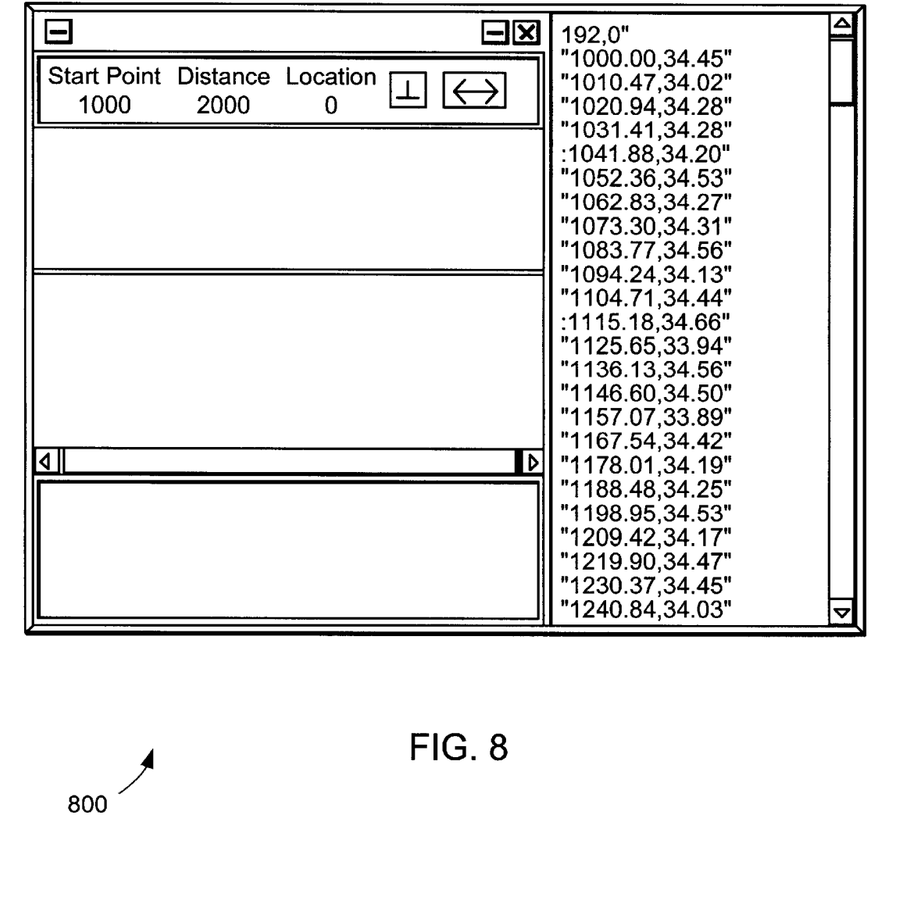
FIG. 8 is a display screen view of a graphical user interface for communicating with the Copper Loop Tester of the present invention.

FIG. 8 is a display screen view of a Graphical User Interface (GUI) 800 for communicating with the Copper Loop Tester 700 of the present invention via the direct CLT control port 552. The GUI 800 is generated by a computer operating system capable of generating graphical user interfaces; such operating systems include Windows '98 from Microsoft Corporation or the Macintosh Operating System from Apple Computer, Inc. Those skilled in the art will recognize that any operating system capable of generating graphical user interfaces may be used. The embodiment of the GUI 800 shown in FIG. 8 is displaying the partial results of a time domain reflectometry test. The GUI 800 displays information regarding the test being run and the results of the test in both graphical and numerical form. The GUI 800 is also capable of receiving inputs, from a human operator, designating tests, test parameters, and other commands and information. Those skilled in the art will realize how the GUI 800 may be used to facilitate inputs for various tests, may display test results, and may display test set up.

In an exemplary embodiment, the present invention is a Lucent Stinger™ DSL Access Concentrator (Lucent Technologies Incorporated, Murray Hill, N.J.) having a first and a second Switching and Control Module (SCM); a first and a second trunk module; and in which each line card 110 is implemented using a 48 port Line Protection Module; each xDSL modem card 120, 122 is implemented using a Line Interface Module; and having a Path Selection Module (PSM) that incorporates a relay matrix as well as a CLT module capable of determining local loop electrical characteristics.

Figure 9:
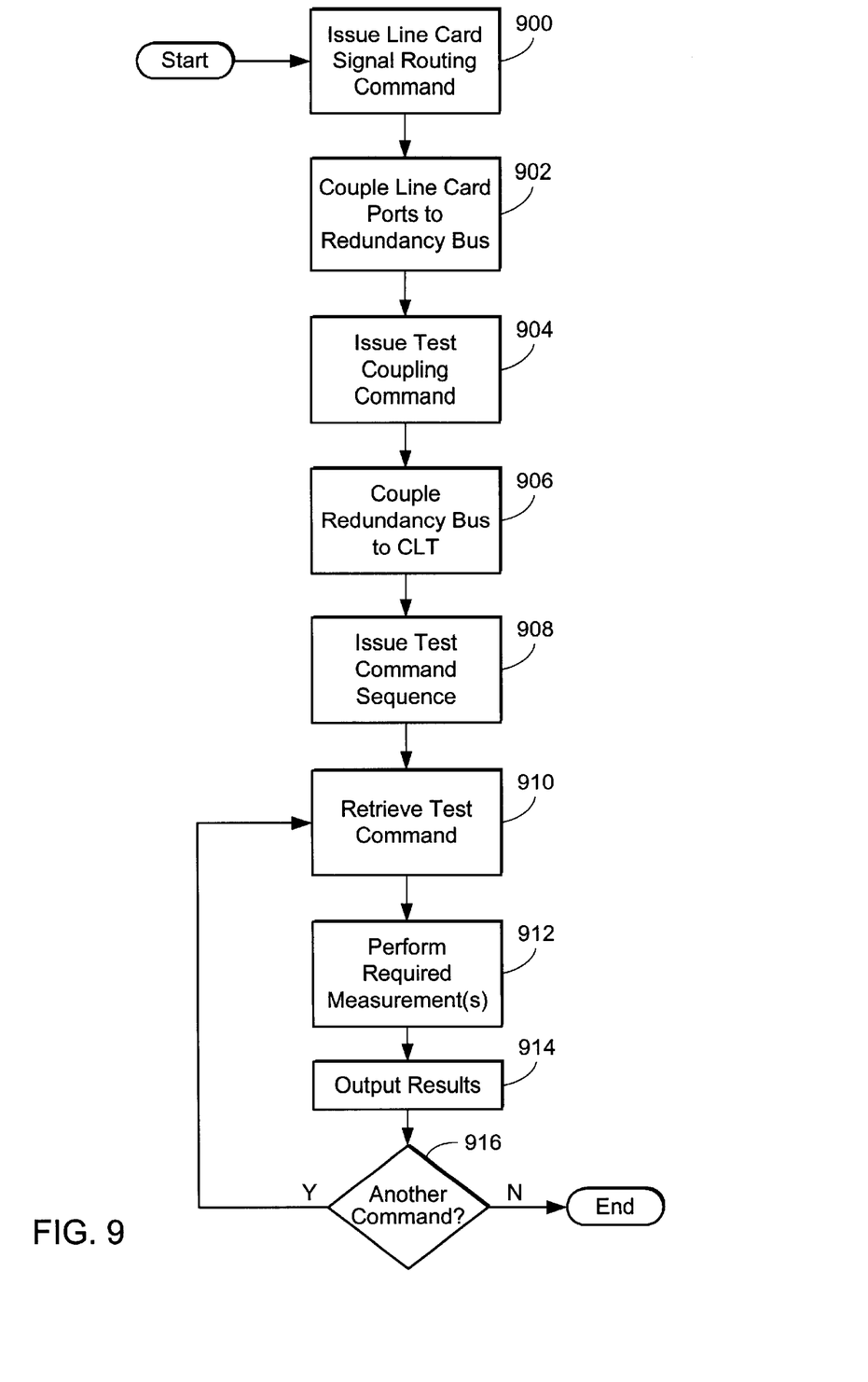
FIG. 9 is a flowchart of a method for performing local loop testing in accordance with the present invention.

FIG. 9 is a flowchart of a method for performing local loop testing in accordance with the present invention. In one embodiment, the method begins in step 900 with the control unit 140 issuing a line card signal routing command to a particular line card 110. In response, the line card's redundancy selection switch 400 decouples one or more of the line card's k ports from its corresponding xDSL modem card 120, and couples the ports to the redundancy bus 186 in step 902. Next, in step 904, the control unit 140 issues a test coupling command to the test and switching unit's control logic 520, which in turn outputs one or more commands or control signals directed to the relay matrix 530. In response, the relay matrix 530 couples the redundancy bus 186 to the CLT 700 in step 906. The relay matrix 530 may further couple the redundancy bus 186 to the redundant xDSL modem card 122, in accordance with the test coupling command, in the event that electrical tests or measurements are to be performed while the subscriber loop is coupled to other portions of the DSL network.

In step 908, the control unit 140 issues or writes a sequence of test commands and any associated test setup or initialization parameters to the test and switching unit's memory 540. The CLT 700 subsequently retrieves a test command and any associated parameters from the memory 540 in step 910. In one embodiment, the CLT 700 polls the memory 540 to determine whether a newly-arrived test command is present. Those skilled in the art will recognize that the control logic 520 could issue a notification signal to the CLT 700 to indicate the arrival of a test command in an alternate embodiment. The CLT 700 subsequently performs one or more electrical tests or measurements in accordance with the retrieved test command in step 912. During the performance of step 912, the CLT's processing unit 702 and/or DSP 704 communicate with particular test circuits 750, 752, 754, in a manner described in detail in U.S. patent application Ser. No. 09/215,421, entitled "Telecommunications Transmission Test Set," filed on Dec. 18, 1998. Following step 912, the CLT 700 writes results corresponding to the tests performed into the memory 540 in step 914. The CLT 700 next examines whether another test command is present in the memory 540 to determine whether an additional test or measurement is required in step 916. If so, the method returns to step 910. Otherwise, the method ends.

After the CLT 700 has stored results corresponding to a particular test in the memory 540, the control unit 140 may retrieve the test results. In one embodiment, the control unit 140 polls the memory 140 via commands issued to the test and switching unit's control logic 520 to determine whether the memory 540 contains any newly-generated, unretrieved, or unsuccessfully retrieved test results. Those skilled in the art will recognize that in an alternate embodiment, the control logic 520 could issue a notification signal to the control unit 140 to indicate the presence of such test results after the CLT 700 had stored the results in the memory 540. Once the above method completes, the control unit 140 may issue commands to a) alter the manner in which the subscriber loop is coupled to the DSL network; b) select another port for testing; or c) recouple the line card port or ports for which testing had been performed to the corresponding xDSL modem card 120.

Table 1 describes a set of local loop tests supported by the Copper Loop Tester 700 of the present invention.

TABLE 1

Time Domain Reflectometry
Background Noise
Impulse Noise
Insertion Loss
Load Coil Detection
Bridge Tap Detection
Digital Multi-Meter Measurement
DC Delta Measurement
Capacitance Equivalent Measurement
Tone Measurement
Far End Ringer Detection
Far End xDSL Modem Detection
Loop Resistance Measurement
Loop Impedance Measurement
Loop Capacitance Measurement
Current Test Many of these tests are described in U.S. patent application Ser. No. 09/215,421, entitled "Telecommunications Transmission Test Set," filed on Dec. 18, 1998; and U.S. patent application Ser. No. 09/295,857, entitled "Detection of Bridge Tap Using Frequency Domain Analysis," filed on Apr. 21, 1999. Those skilled in the art will recognize that the CLT 700 may support other, additional, or fewer tests in an alternate embodiment.

Table 2 provides a listing of commands for communicating with the Copper Loop Tester 700 of the present invention.

TABLE 2

| COMMAND | BRIEF DESCRIPTION |
| --- | --- |
| MEAS-DMM | Measure Digital Multi-Meter |
| RSLT-DMM | Result Digital Multi-Meter |
| MEAS-DMM-DCDELTA | Measure Digital Multi-Meter DC Delta |
| RSLT-DMM-DCDELTA | Result Digital Multi-Meter DC Delta |
| MEAS-DMM-CAPEQU | Measure Digital Multi-Meter Capacity Equivalent |
| RSLT-DMM-CAPEQU | Result Digital Multi-Meter Capacity Equivalent |
| MEAS-DMM-ALL | Measure Digital Multi-Meter All Information |
| RSLT-DMM-ALL | Result Digital Multi-Meter All Information |
| MEAS-LINE-CALIB | Measure Line Calibration |
| MEAS-LINE | Measure Line |
| RSLT-LINE | Result Line |
| SEND-TONE | Send Tone |
| SEND-CTRL-TONE | Send Control Tone |
| SEND-TRACE-TONE | Send Trace Tone |
| STOP-TONE | Stop Tone |
| MEASURE-RINGER | Measure Ringer |
| RSLT-RINGER | Result Ringer |
| MEAS-CPE-MODEM | Measure Customer Premises Equipment Modem |
| RSLT-CPE-MODEM | Result Customer Premises Equipment Modem |
| VER-CHECK | Version Check |
| RSLT-VER | Result Version Check |
| SET-TDR | Set Time Domain Reflectometry Parameters |
| MEAS-TDR | Measure Time Domain Reflectometry |
| MEAS-BTAP | Measure Bridge Tap |

Those skilled in the art will understand that the CLT 700 may be capable of processing or executing other, additional, or fewer commands in an alternate embodiment.

While the present invention has been described with reference to certain embodiments, those skilled in the art will recognize that variations or modifications may be provided. The description herein provides for such variations, and is limited only by the following claims.

What is claimed is:

1. The Digital Subscriber Line Access Multiplexer comprising:
   a line protection unit coupled to Customer Premises Equipment,
   a first xDSL modem coupled to the line protection unit;
   a communication traffic management unit coupled to the first xDSL modem and a high-speed network;
   a subscriber loop characterization unit coupled to the line protection unit;
   a first switch coupled between the line protection unit, the first xDSL modem, and the subscriber loop characterization unit;
   a second switch coupled to the first switch and the subscriber loop characterization unit; and
   a second xDSL modem coupled to the communication traffic management unit and the second switch.

2. The Digital Subscriber Line Access Multiplexer of claim 1, wherein the second switch includes a control input coupled to the communication traffic management unit.

3. The Digital Subscriber Line Access Multiplexer of claim 1, further comprising an interface unit to which the line protection unit, the first xDSL modem, the communication traffic management unit, and the subscriber loop characterization unit are coupled.

4. The Digital Subscriber Line Access Multiplexer of claim 1, wherein the interface unit comprises one from the group of a midplane circuit board and a backplane circuit board.

5. The Digital Subscriber Line Access Multiplexer of claim 1 wherein the subscriber loop characterization unit is selected from a group consisting of a Digital Multimeter unit, a Time Domain Reflectometry unit, a line impairment test unit, and a combination thereof.

6. The Digital Subscriber Line Access Multiplexer of claim 1 wherein the subscriber loop characterization unit comprises:
   a processing unit;
   a memory coupled to the processing unit; and
   a test unit coupled to the processing unit, the test unit comprising one from the group of a Digital Multimeter unit, a Time Domain Reflectometry unit, and a line impairment test unit.

7. The Digital Subscriber Line Access Multiplexer of claim 1 wherein the first switch includes a control input coupled to the communication traffic management unit.

8. The Digital Subscriber Line Access Multiplexer of claim 1, further comprising:
   means for testing a copper loop; ad
   means for selectively coupling signals between the testing means and a copper loop.

9. The Digital Subscriber Line Access Multiplexer of claim 1 further comprising means for controlling the coupling means.

10. The Digital Subscriber Line Access Multiplexer of claim 1 further comprising means for storing at least one of command signals, data signals, and control signals for the testing means.

11. The Digital Subscriber Line Access Multiplexer of clam 9, further comprising means for coupling and decoupling signals from a line interface unit to the testing coupling means.

12. A method for performing local loop testing comprising the steps of:
providing:
  a line protection unit coupled to Customer Premises Equipment;
  a first xDSL modem coupled to the line protection unit;
  a communication traffic management unit coupled to the first xDSL modem and a high-speed network;
  a subscriber loop characterization unit coupled to the line protection unit;
  a first switch coupled between the line protection unit, the first xDSL modem, and the subscriber loop characterization unit;
  a second switch coupled to the first switch and the subscriber loop characterization unit; and
  a second xDSL modem coupled to the communication traffic management unit and the second switch;
coupling the line protection unit to the subscriber line characterization unit in response to a signal issued by the communication traffic management unit;
outputting a test command with the communication traffic management unit; and
performing an electrical test upon the subscriber loop using the subscriber loop characterization unit in response to the test command.

13. The method of claim 12, further comprising the step of returning a result corresponding to the electrical test to the communication traffic management unit.

14. The method of claim 12, further comprising the step of coupling the line protection unit to the second xDSL modem in response to a signal issued by the communication traffic management unit.

15. The method of claim 12, further comprising the step of returning a result corresponding to the electrical test to the communication traffic management unit.

16. The method of claim 12, further comprising the step of decoupling the subscriber loop test unit from the second xDSL modem in response to a signal issued by the communication traffic management unit.

17. The method of claim 12, further comprising the step of decoupling the second xDSL modem from the line protection unit in response to a signal issued by the communication traffic management unit.

18. The method of claim 12, further comprising the step of coupling the line protection unit to the first xDSL modem in response to a signal issued by the communication traffic management unit.

* * * * *